US012731930B2

(12) United States Patent
Beissert et al.

(10) Patent No.: US 12,731,930 B2
(45) Date of Patent: Sep. 8, 2026

(54) PLUG CONNECTION FOR HIGH-FREQUENCY-BASED FIELD DEVICES

(71) Applicant: Endress+Hauser Flowtec AG, Reinach (CH)

(72) Inventors: Markus Beissert, Auggen (DE); Frank Voigt, Weil am Rhein (DE); Thilo Ihringer, Rheinfelden (DE)

(73) Assignee: Endress+Hauser Flowtec AG, Reinach (CH)

( * ) Notice: Subject to any disclaimer, the term of this patent is extended or adjusted under 35 U.S.C. 154(b) by 230 days.

(21) Appl. No.: 18/554,859

(22) PCT Filed: Apr. 8, 2022

(86) PCT No.: PCT/EP2022/059364
§ 371 (c)(1),
(2) Date: Oct. 11, 2023

(87) PCT Pub. No.: WO2022/218836
PCT Pub. Date: Oct. 20, 2022

(65) Prior Publication Data

US 2024/0195102 A1 Jun. 13, 2024

(30) Foreign Application Priority Data

Apr. 14, 2021 (DE) ..................... 10 2021 109 407.0

(51) Int. Cl.
*H01R 13/11* (2006.01)
*H01Q 1/12* (2006.01)
*H01R 24/64* (2011.01)

(52) U.S. Cl.
CPC ............... *H01R 13/11* (2013.01); *H01Q 1/12* (2013.01); *H01R 24/64* (2013.01); *H01R 2201/02* (2013.01)

(58) Field of Classification Search
None
See application file for complete search history.

(56) References Cited

U.S. PATENT DOCUMENTS 7,628,628 B2 12/2009 Matsuda et al.
2004/0183550 A1* 9/2004 Fehrenbach ............ G01F 23/14 324/662

(Continued)

FOREIGN PATENT DOCUMENTS

CN 1688869 A 10/2005
CN 109211291 A 1/2019

(Continued)

*Primary Examiner* — Crystal L Hammond
(74) *Attorney, Agent, or Firm* — Kelly J. Smith; Endress+Hauser (USA) Holding, Inc.

(57) ABSTRACT

The present disclosure relates to a high-frequency plug connection for high-frequency-based field devices, consisting of plugs and corresponding sockets. The high-frequency plug connection is characterized in that the at least one plug is resiliently enclosed by an enclosure such that this/these plug(s) is/are moveable radially with respect to its/their plugging axis. This has the advantage of reducing the risk of jamming against the enclosure when the plugs are inserted in the corresponding sockets, during fastening of the circuit board substrate on which the sockets are arranged. A modular design of the high-frequency-based field device, and the manufacturability thereof, are simplified as a result.

9 Claims, 4 Drawing Sheets

(56) References Cited

U.S. PATENT DOCUMENTS

| | | | | |
|---|---|---|---|---|
| 2006/0051997 | A1 | 3/2006 | Kooiman | |
| 2014/0206221 | A1 | 7/2014 | Morley | |
| 2019/0014391 | A1 * | 1/2019 | Brockhaus | H04Q 9/00 |

FOREIGN PATENT DOCUMENTS

| | | | |
|---|---|---|---|
| CN | 111952802 | A | 11/2020 |
| DE | 20313695 | U1 | 12/2003 |
| DE | 69838082 | T2 | 4/2008 |
| DE | 20321736 | U1 | 5/2009 |
| DE | 202008007772 | U1 | 10/2009 |
| EP | 3425345 | A1 | 1/2019 |

* cited by examiner

PLUG CONNECTION FOR HIGH-FREQUENCY-BASED FIELD DEVICES

CROSS-REFERENCE TO RELATED APPLICATIONS

The present application is related to and claims the priority benefit of DPMA Patent Application No. 10 2021 109 407.0, filed on Apr. 14, 2021, and International Patent Application No. PCT/EP2022/059364, filed Apr. 8, 2022, the entire contents of which are incorporated herein by reference.

TECHNICAL FIELD

The invention relates to a plug connection for high-frequency-based field devices.

BACKGROUND

In automation technology, especially for process automation, field devices are often used which serve to capture various measured variables. The measured variable to be determined can be, for example, a fill level, a flow rate, a pressure, a temperature, a pH, the redox potential, a conductivity or the permittivity of a medium in a process facility. For detecting the corresponding measured values, the field devices each comprise suitable sensors or are based on suitable measurement methods. A large number of different types of field devices are manufactured and marketed by the Endress+Hauser group of companies.

Field devices are increasingly of modular design in order to be able to use individual modules in different types of field devices according to the platform principle, and to enable replacement of defective modules. However, at least in the case of high-frequency-based field devices, such as humidity measuring devices and fill level measuring devices, this is challenging in that high-frequency connections, such as between the antenna arrangement and the high-frequency module, have to be shielded. In this regard, the term "high-frequency" in the context of this patent application refers to corresponding signals having frequencies between 0.03 GHz and 300 GHz.

SUMMARY

The necessary shielding of the high-frequency connections requires comparatively large and inflexible connections, for example in the form of SMA- or SMB plug-in connections. As a result, in particular during insertion, there is the risk of jamming when multiple plug-in connections are arranged next to one another. At least the sockets of the plug-in connections are often arranged directly on a circuit board of the corresponding module, for example by means of reflow soldering, together with the other components on the circuit board, it being possible for the actual distance between the sockets to deviate from the target distance due to manufacturing tolerances. This leads to jamming during plugging in or unplugging, and thus potentially to the destruction of the entire high-frequency module. The object of the invention is therefore that of providing a high-frequency module which can be easily and reliably installed in the field device.

The invention achieves this object by a high-frequency-based field device for determining a process variable of a medium in a container, comprising the following components:

- at least one transmitting and/or receiving antenna which can be attached to the container in order to transmit the high-frequency signal toward the medium, and/or to receive the high-frequency signal after interacting with the medium,
- a device neck which can be arranged on the container in order to contact the at least one antenna,
- an enclosure which resiliently encloses at least one plug in such a way that said plug(s) is/are movable radially to the plugging axis thereof, the enclosure being inserted into the device neck in such a way that the at least one plug is in each case contacted to the at least one antenna, and
- a high-frequency module comprising
  - a circuit board substrate on which at least one socket corresponding to the plug is arranged, and
  - an electronic unit arranged thereon, which is designed to generate the high-frequency signal to be coupled in, and to determine the process variable on the basis of the received high-frequency signal, the electronic unit being connected to the at least one socket for this purpose.

According to the invention, the circuit board substrate can be fastened to the enclosure such that the at least one plug is inserted into the at least one socket.

In this case, the plug(s) and the corresponding sockets can be designed as commercially available SMA or SMB connectors. Within the scope of the invention, it is also not stipulated whether the plug is the "male" or "female" component of the high-frequency plug connection, or whether the socket is the corresponding "female" or "male" component of the high-frequency plug connection.

According to the invention, the high-frequency plug connection is characterized in that the enclosure resiliently encloses at least the one plug in such a way that said plug(s) is/are movable radially to the plugging axis within a defined region. Due to the resilient enclosure of the plug according to the invention, this is flexible, in order not to jam during insertion. In order to resiliently enclose the plug, the enclosure can enclose the resiliently enclosed plugs, for example by means of a resilient sheath and/or by means of in particular three snap hooks, other adequate designs also being conceivable.

The invention has an advantageous effect in particular when more than one socket is arranged on the circuit board substrate at a defined distance from one another and is oriented in parallel with respect to its plugging axis, and when, corresponding to the sockets, at least two plugs are enclosed at the defined distance from one another and in parallel with respect to their plugging axis. Since, in this case, according to the invention, at least one of the plugs is also arranged flexibly, any manufacturing tolerances with respect to the socket target distance on the substrate are compensated for when the plug is inserted into the sockets, which tolerances could otherwise, during insertion, lead to damage to the socket fastening (usually soldering) on the substrate. The safety against jamming during insertion can be further increased if a corresponding guide element for inserting the plugs or the sockets in the direction of the plugging axis is formed on the circuit board substrate or in the enclosure.

In connection with the field device, the term "unit", within the context of the invention refers in principle to every electronic circuit which is designed appropriately for the intended use. Thus, depending on the requirement, it can be an analog circuit for generating or processing corresponding analog signals. However, it can also be a digital circuit, such as an FPGA or a storage medium in cooperation with a program. In this case, the program is designed to carry out the corresponding method steps or to apply the necessary computing operations for the respective unit. In this context, different electronic units of the measuring device, within the meaning of the invention, can potentially also draw on a common physical memory or be operated by means of the same physical digital circuit.

The term "interaction" in the context of the invention refers, depending on the type and mode of operation of the field device, to either transmission through the medium along a defined measurement path (i.e., between the transmitting antenna and the receiving antenna), or to reflection on the medium.

The type of fastening of the enclosure on the device neck is not prescribed in a fixed manner within the scope of the invention. In particular, when the device neck or the enclosure is designed having a round cross section, the enclosure can be fastened to the device neck by means of a bayonet closure mechanism, for example.

Thanks to the design according to the invention, the field device can be mounted by means of fewer method steps:

arranging the device neck and the at least one antenna on the container, if the antennas, the device neck and the container are not already provided as an integral assembly, inserting the plugs into the enclosure, inserting the enclosure in the device neck, and attaching the circuit board substrate to the enclosure by inserting the plugs into the sockets.

BRIEF DESCRIPTION OF THE DRAWINGS

The present disclosure will be explained in more detail with reference to the following figures. In the figures.

DETAILED DESCRIPTION

Figure 1:
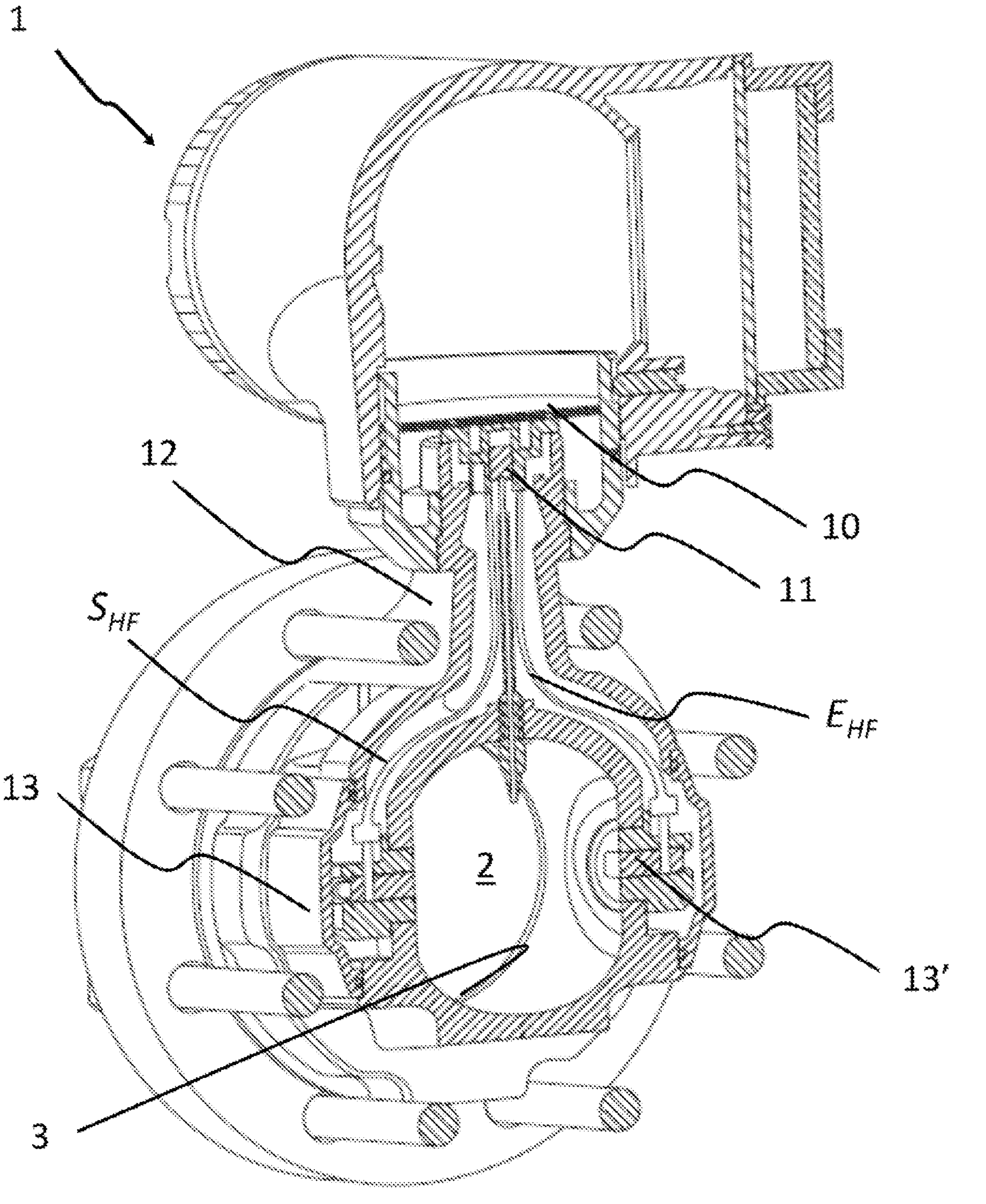
FIG. 1 shows a high-frequency-based field device on a pipeline portion.

For general understanding of the invention, a high-frequency-based field device 1 is shown in FIG. 1 as a sectional view, which field device serves to measure a moisture or a solid portion of a medium 2. For this purpose, the field device 1 is arranged on a pipeline portion 3 through which a gaseous medium 2 such as propane, nitrogen, etc., or a liquid medium 2 such as fuel, beverages or wastewater having solid-like sediments flows. In order to determine the moisture or the solids content as a specific process variable, a transmitting antenna 13 and a receiving antenna 13' of the field device 1 are arranged opposite one another on the inner wall of the pipeline portion 3 and are aligned relative to one another. The transmitting antenna 13 is used to transmit high-frequency signals $S_{HF}$ towards the medium 2, while the receiving antenna 13' receives the high-frequency signals $E_{HF}$ after these have passed through the resulting measurement path. In this case, the antennas 13, 13' can in principle be designed identically.

The high-frequency signal $S_{HF}$ is generated by a correspondingly designed high-frequency module of the field device 1, which is connected to the transmitting antenna 13 for this purpose. Based on the received signal $E_{HF}$, the field device 1 in turn determines the moisture or the solids content of the medium 2 as the process variable. For this purpose, the high-frequency module is also connected to the receiving antenna 13' in order to determine the phase, the signal transit time and/or the amplitude of the received signal $E_{HF}$. From this, the evaluation unit 12 can for example in turn determine the moisture/the solids content of the medium 2 on the basis of corresponding calibration data. In order to generate the high-frequency signal $S_{HF}$, the high-frequency module can comprise, for example, a PLL ("Phase Locked Loop"). In particular for determining the phase, the signal transit time and/or the amplitude of the received signal $E_{HF}$, the high-frequency module can comprise a network analyzer, for example.

As an alternative to the variant of the field device 1 shown in FIG. 1, one of the antennas 13, 13' of the field device 1 can also be designed as a combined transmitting/receiving antenna, while a reflector for the high-frequency signal $S_{HF}$, $E_{HF}$ is attached at the location for the other antenna 13, 13'. In this case, the high-frequency module for separating the high-frequency signal $S_{HF}$ to be transmitted from the received signal $E_{HF}$ is to be connected to the transmitting/receiving antenna via a transceiver switch. In another variation thereof, the reflector can also be dispensed with, such that it is not the transmitted component $E_{HF}$ that is determined via the combined transmitting/receiving antenna, but rather the component of the generated high-frequency signal $S_{HF}$ that is reflected at the transmitting/receiving antenna that is determined by the evaluation unit 12. Analogously to the transmittive method, in the case of this reflective method, the moisture of solids content of the medium 2 can be determined via the reflected component of the generated high-frequency signal $S_{HF}$.

As shown in FIG. 1, the antennas 13, 13' are connected to the high-frequency module via a device neck 12 or high-frequency-capable cables (for example coaxial cables) extending therein, in order to space the high-frequency module and optionally further electronic modules of the field device 1 from the pipeline portion 3. In this case, the pipeline portion 3 and the device neck 12 can be made, for example, monolithically from a stainless steel. As a result, the high-frequency module is protected, inter alia, from thermal influences of the possibly hot medium 2.

Figure 2:
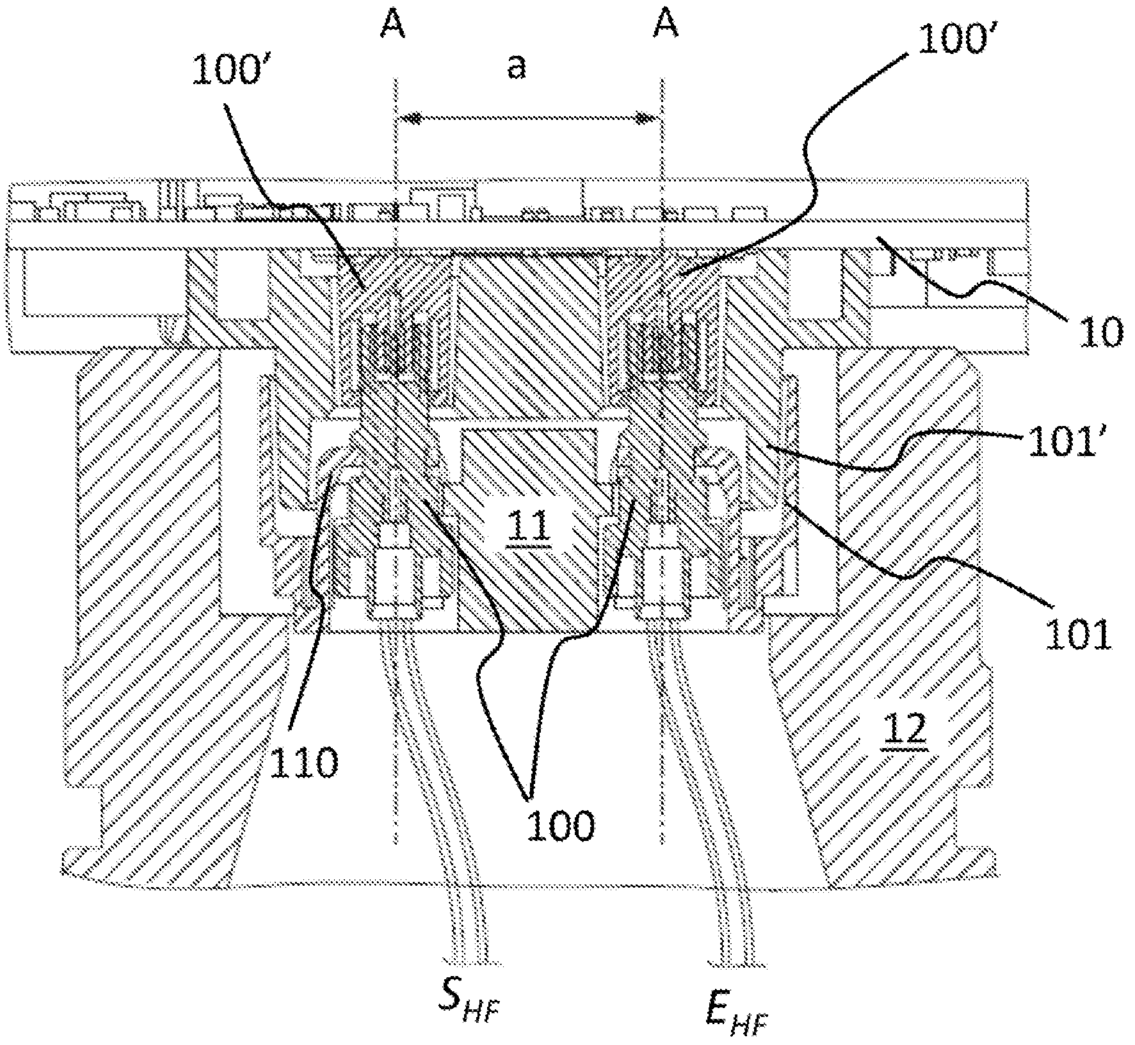
FIG. 2 shows a cross-sectional view of an embodiment of the high-frequency plug connection according to the present disclosure between the antenna and the high-frequency module.

For assembly, or in order that the high-frequency module can be replaced if necessary, the high-frequency module is arranged by means of a plug-in connection on that end region of the device neck 12 which faces away from the pipeline portion 3. An enlarged view in the region of this plug-in connection is shown in FIG. 2: On the side of the high-frequency module, the plug-in connection comprises two sockets 100' which are arranged at a defined distance a from one another on a circuit board substrate 10 of the high-frequency module on which, for example, the network analyzer or the PLL can also be located. In this case, the high-frequency module can transmit the high-frequency signal $S_{HF}$ to be emitted via one of the sockets 100', and the high-frequency module can receive the high-frequency signal E HF via the other socket 100'. In order that the high-frequency module can be inserted into corresponding plugs 100 of the plug-in connection on the side of the housing neck 12, the sockets 100' are arranged on the circuit board substrate 10 such that their plugging axes A extend orthogonally to the circuit board 10 and thus also in parallel with one another.

On the side of the housing neck 12, the two coaxial cables leading from the antennas 13, 13', which transmit the individual high-frequency signal $S_{HF}$, $E_{HF}$ lead into one of the plugs 100 in each case. In this case, the plugs 100 are enclosed in an enclosure 11 for the purpose of insertability into the sockets 100', in such a way that, in relation to their plugging axis A, the distance a from one another corresponds to the distance a of the module-side sockets 100' on the circuit board substrate 10, and in such a way that the plugging axes A of the plugs 100 also extend in parallel with one another. Thus, the enclosure 11, together with the plugs 100 and the corresponding sockets 100', on the circuit board substrate 10 of the high-frequency module 10, form the high-frequency plug connection. For example, SMA or SMB connectors and sockets can be used as the plug type. In this case, the enclosure 11 can be produced, for example, from a plastics processed by injection molding.

As is also shown in FIG. 2, the high-frequency module and the device neck 12 are designed to be compatible with one another in such a shape that the device neck 12 forms an end stop for the circuit board substrate 10 in the inserted state of the plugs 100 or the sockets 100', or vice versa. As a result, the plug connection 100, 100' assumes a stable state after insertion or when the high-frequency module is mounted. In this case, the high-frequency module can be additionally fixed on the device neck 12 or on the enclosure 11 for example by means of a screw connection.

When attaching the high-frequency module 10 to the housing neck or during the associated insertion of the plugs 100 into the sockets 100', it is critical that the distance a of the sockets 100' can deviate from the target value, depending on the manufacturing technology. Regardless of whether, if appropriate, the corresponding distance a of the plugs 100 from one another in the enclosure 11 also deviates from the target value, this can lead to jamming of the plugs 100 and sockets 100' when the high-frequency module is inserted or attached. As a result, this can lead for example to damage to the high-frequency module 10, in that, for example, the solder connection between the sockets 100' and the circuit board substrate 10 is damaged.

Figure 3:
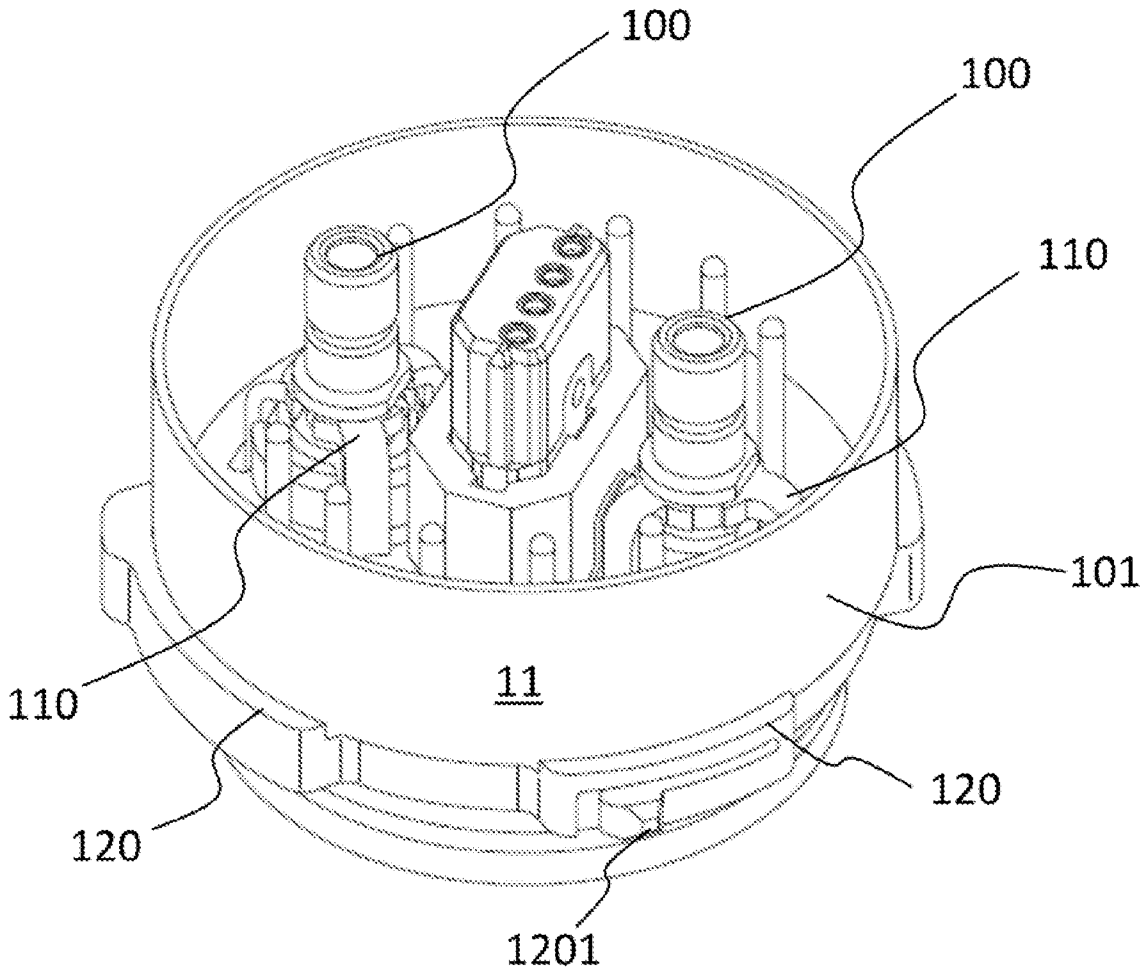
FIG. 3 shows a side view of a possible design of the enclosure of the plug connection.

In order to prevent this, and in order to thus ensure reliable assembly, according to the invention both plugs 100 are enclosed in the enclosure 11 by three snap hooks 110 in each case, as shown in the perspective view of the enclosure in FIG. 3. As a result, the plugs 100 are resiliently enclosed with respect to their plugging axis A, so that they are movable with respect to the plugging axis A in a defined radius of, for example, 20% of their diameter. This flexible arrangement of the plugs 100 thus prevents jamming during insertion. In this case, in contrast to the snap-in hooks 110 shown in FIGS. 2 and 3, the movable enclosure can also be achieved by a resilient sheathing of the plugs in the enclosure 11.

In FIG. 3, it is also clear that the two plugs 100 in the enclosure 11 are enclosed by a guide element 101 having a circular cross section with respect to the plugging axis A. As can be seen above all in FIG. 2, during insertion this guide element 101 engages concentrically in a corresponding guide element 101', which is arranged with a correspondingly round cross section around the sockets 100' on the circuit board substrate 10 of the high-frequency module. This additionally reduces the risk of jamming during insertion.

Figure 4:
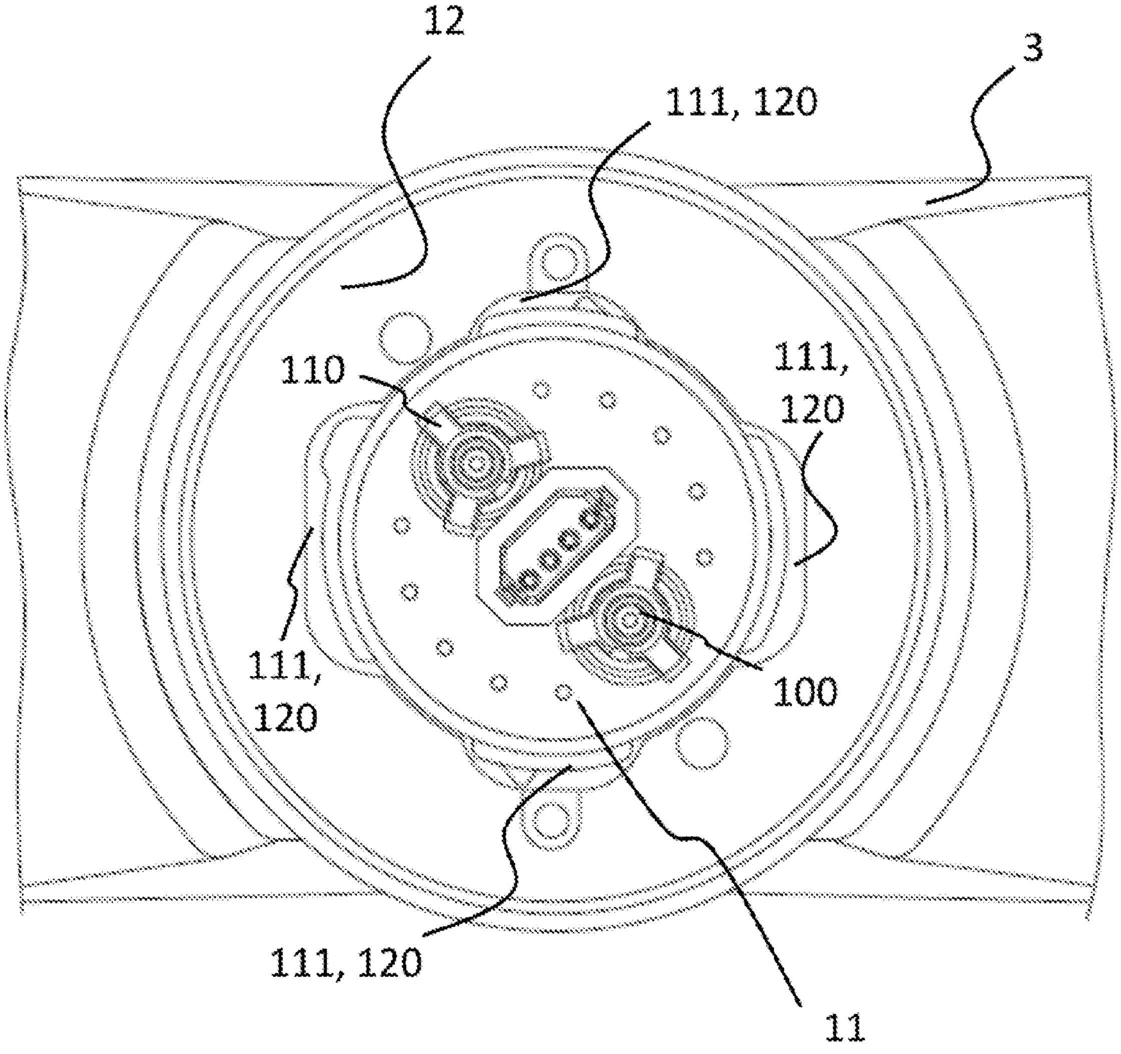
FIG. 4 shows a plan view of the enclosure mounted on the device neck.

As can be seen from FIG. 3 and FIG. 4, in the variant shown, the enclosure 11 can be fastened to the end region of the device neck 12, for example by means of a bayonet closure mechanism, which faces away from the pipeline portion 3. For this purpose the enclosure 11, which is essentially round with respect to the plugging axes A, comprises four laterally arranged cams 111 which can be inserted into four corresponding grooves 120 in the device neck 12 and allow closing after a rotation of the enclosure 11 about approximately 45° in the clockwise direction (viewed in the direction towards the device neck 12). In this case, the plan view of the enclosure 11 and the pipeline portion 3 in FIG. 4 shows the position of the enclosure 11 inserted into the grooves 120, in which the enclosure 11 is, however, not yet rotated by 45° in the clockwise direction or is not yet locked. As can also be seen there, the two opposite cams 111 and grooves 120 have a geometry or width which deviates from the other two pairs of cams 111 and grooves 120. Furthermore, two opposite cams 111 additionally each comprise a radially engaging latching hook 1201, which, in the position of the enclosure 11 rotated about 45° in the clockwise direction, snap into corresponding latching notches of the corresponding grooves 120. As a result, the enclosure 11 can be mounted in an obvious manner and without a risk of confusion.

For mounting the high-frequency module, prior to the insertion of the enclosure 11 on the device 12, the two plugs 100, which the coaxial cables adjoin in the direction of the antennas 13, 13', are to be latched into the enclosure 11 or the corresponding snap hooks 110. After fastening or securing the enclosure 11 to the device neck 12, the circuit board substrate 10 can be attached to the enclosure 11 by inserting the plugs 100 quasi synchronously into the sockets 100'. In this case, it is not relevant whether the device neck 12 and the antennas 13, 13' are already arranged on the pipeline portion 3 or not.

As shown in FIG. 1 to FIG. 4, the variant of the plug connection there comprises two plugs 100 or two sockets 100'. In this case, in the sense of the invention, it is also conceivable for the plug connection to also comprise more or fewer plug pairs 100, 100', depending on the requirement.

The invention claimed is:

1. A high-frequency-based field device for determining a process variable of a medium in a container, comprising:

at least one transmitting and/or receiving antenna which can be attached to the container in order to transmit a high-frequency signal toward the medium, and/or to receive the high-frequency signal after interacting with the medium, a device neck which can be arranged on the container in order to contact the at least one antenna, an enclosure which resiliently encloses at least one plug in such a way that the at least one plug is movable with respect to the enclosure radially with respect to a plugging axis thereof, wherein the enclosure is inserted in the device neck in such a way that the at least one plug is in each case contacted to the at least one antenna, a high-frequency module comprising a circuit board substrate on which at least one socket corresponding to the at least one plug is arranged, and an electronic unit arranged on the circuit board substrate, wherein the electronic unit is designed to generate the high-frequency signal to be coupled, and to determine the process variable on the basis of the received high-frequency signal, wherein the electronic unit is connected to the at least one socket for this purpose, and wherein the circuit board substrate can be fastened to the enclosure in the device neck in such a way that the at least one plug is inserted into the at least one socket.

2. The field device according to claim 1, wherein at least two sockets are arranged at a defined distance from one another on the circuit board substrate and are aligned in parallel with respect to their plugging axis, and wherein, corresponding to the sockets, at least two plugs are enclosed at the defined distance from one another and in parallel with respect to their plugging axis.

3. The field device according to claim 2, wherein the plugs and sockets are designed as SMA- or SMB connectors.

4. The field device according to claim 1, wherein the enclosure encloses the resiliently enclosed plug(s) using three snap hooks in each case.

5. The field device according to claim 1, wherein the enclosure encloses the resiliently enclosed plug(s) using a resilient sheath.

6. The field device according to claim 1, wherein in each case a corresponding guide element for inserting the plugs or the sockets is formed on the circuit board substrate or in the enclosure, in the direction of the plugging axis.

7. The field device according to claim 1, wherein, in the plugged-in state of the plugs and/or the sockets, the device neck forms an end stop for the circuit board substrate.

8. The field device according to claim 1, wherein the enclosure can be fastened to the device neck by means of a bayonet locking mechanism.

9. A method for manufacturing the field device according to claim 1, comprising the following method steps:

arranging the device neck and the at least one antenna on the container, inserting the plugs into the enclosure, inserting the enclosure into the device neck, and inserting the plugs into the sockets by fastening the circuit board substrate to the enclosure.

* * * * *